Aug. 13, 1929.   G. H. STONER   1,724,114
BRAKE
Filed Aug. 26, 1926
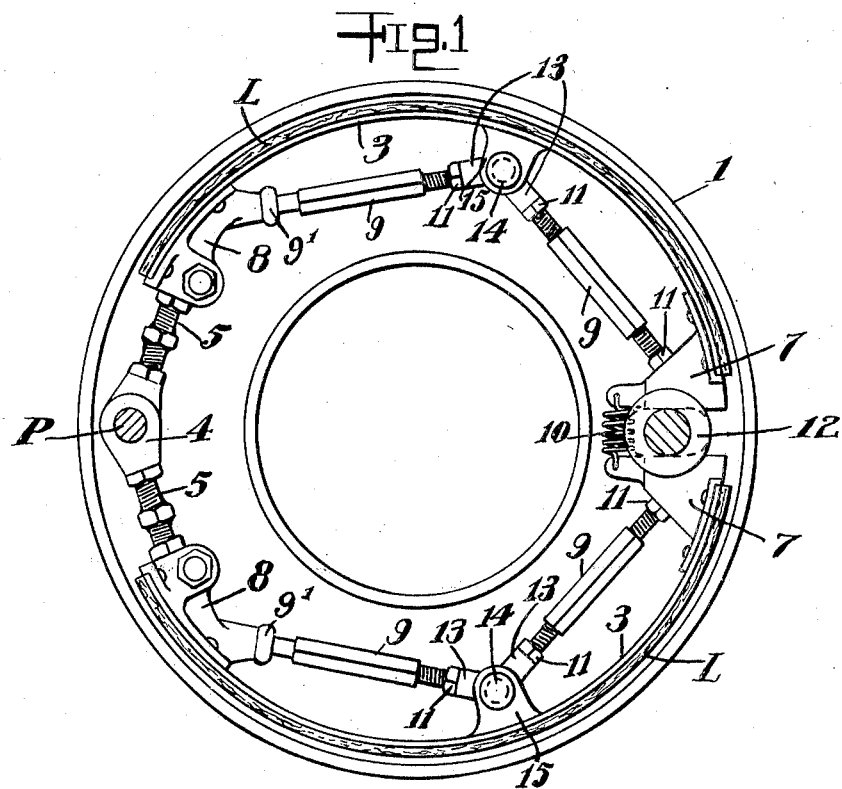
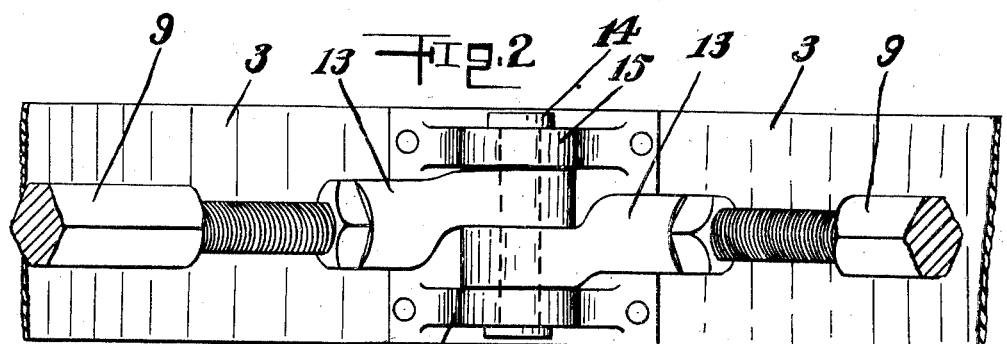
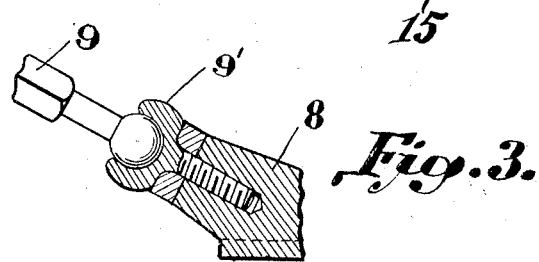
Inventor
George H. Stoner
By Ellis Spaeth
Attorney Patented Aug. 13, 1929.

1,724,114

UNITED STATES PATENT OFFICE.

GEORGE H. STONER, OF EAST BOSTON, MASSACHUSETTS, ASSIGNOR, BY MESNE ASSIGNMENTS, TO STONER-AMES BRAKE COMPANY, INC., OF BOSTON, MASSACHUSETTS, A CORPORATION OF MASSACHUSETTS.

BRAKE.

Application filed August 26, 1926. Serial No. 131,613.

In my present invention I have provided certain improvements and additions to my former brake inventions as set forth in Letters Patent No. 1,550,398, granted to me August 18, 1925. Reference is made to that patent inasmuch as my present invention relates to a brake of similar type.

In the development of my previous inventions certain conditions were met and difficulties encountered. Among these was the requirement in certain instances for a greater clearance centrally of the brake, as for example, where a large hub or inner member was employed in connection with the wheel or axle or where lateral displacements of any adjacent parts made such clearance necessary. As illustrative of my present invention I have shown in the accompanying drawings a form of brake involving the novel features in forms well adapted to practical use and commercial production. These drawings are understood to be illustrative of the embodiment rather than as limiting in their nature and as such I shall proceed to describe the parts so illustrated as constituting my new brake. Throughout the specification and drawings like reference characters are correspondingly applied.

The characteristic form of my present invention is shown in the accompanying drawings to which reference is made in the appended specification through the usual medium of reference characters. In the drawings:

Fig. 1 is a side elevation of a brake drum with brake shoes installed,

Fig. 2 is a plan view of the central arc bearing of the double strut chord members, and Fig. 3 is a fragment of an end block sectioned to show the ball and socket connection.

In the drawings I have indicated at 1 a usual brake drum within which I mount my novel brake shoes. These preferably consist of the flexible arc members 3 which as explained in my prior Patent No. 1,550,398, are formed of somewhat resilient stock, being shaped to general curvature, but capable of being flexed to produce variation in the radius of curvature.

I have indicated at 12 a conventional cam member such as is usually employed in expanding brake shoes and at P I have indicated the anchor pin on which the brake shoes are generally mounted. At the end of each arc member 3 adjacent the cam 12 I provide a rigid block 7 having one face adapted to contact with the cam. This block 7 is riveted to the end of the arc member 3 and at the opposite end of said arc member 3 is provided another rigid block 8 which is connected by an oppositely threaded coupling 5 to one of a pair of hinge members 4 to provide for the circumferential adjustment of the shoes relative to the cam 12. The members 7 and 8 are each tapped for connection with the chord members 9 as shown in the form selected for illustration.

It will be understood that there may be any number of these chord members, although I have found that four usually gives sufficient clearance and adjustment for ordinary types of axle and hub design.

The connection between the chord members 9 and the blocks 7 and 8 may be direct, as illustratively shown in connection with the block 7, or may be indirect as by a ball and socket joint $9^1$ as shown in Fig. 3. At their opposite ends the chord or strut members 9 are tapped into a pair of hinge members 13 mounted on a pin 14 in a pair of bracket ears 15. These bracket ears are located preferably midway between the castings 7 and 8 and operate to give a resultant thrust upon the operation of the cam 12 centrally of the arc member 3.

The action is something of a toggle joint action and increases the certainty of uniform flexation of the band 3 especially in the case of the larger brake drums. While the operation of the struts or chord members 9 through their bearings is not exactly a toggle action, this word is employed as suggestive of the flexation of the slightly resilient arc member 3 by which it is warped or bent intermediate of its ends and with radial reference to its ends. That is to say, the strut pair in the instance shown constitutes a cooperative subtending device which is capable of producing radial adjustment of the ends relative to the middle, or the middle relative to the ends. These strut rods 9 are held by the lock nuts 11. The usual brake lining is indicated by the reference character L and as in the case of my previous inventions may be of any thickness or character generally used.

Various modifications may obviously be made in detail of structure. In those shown I have followed merely the preferred form indicated in my previous patents and applications as they have been found of great practical efficiency.

What I therefore claim and desire to secure by Letters Patent is:

1. In a brake, an internal expansion member comprising a flexible arc member, a pair of adjustable strut members each having a bearing at one end at the end of the arc member, and having a common bearing intermediate the ends of said arc member for adjusting the curvature of that arc.

2. In a brake, an internal expansion member comprising a pair of flexible arc members, a pair of adjustable struts for each member, and having a common bearing intermediate the ends of the arc member for adjusting the curvature thereof.

3. In a brake, an internal expansion member comprising a flexible arc member, adjustable struts having bearings at points intermediate the operating diameter of the brake for adjusting the curvature of the arc member.

4. In a brake, an internal expansion shoe comprising a flexible arc member, and means for effecting a positive flexation in independent regions of the arc.

In testimony whereof I affix my signature.

GEORGE H. STONER.